(12) United States Patent
Lewin et al.

(10) Patent No.: US 10,213,953 B2
(45) Date of Patent: Feb. 26, 2019

(54) METHOD AND HEATING DEVICE FOR TEMPERATURE CONDITIONING OF PREFORMS AND BLOW MOLDING MACHINE COMPRISING SUCH A DEVICE

(71) Applicant: KHS Corpoplast GmbH, Hamburg (DE)

(72) Inventors: Frank Lewin, Tangstedt (DE); Deniz Ulutürk, Hamburg (DE); Niels Meyer, Schenefeld (DE)

(73) Assignee: KHS Corpoplast GmbH, Hamburg (DE)

( * ) Notice: Subject to any disclaimer, the term of this patent is extended or adjusted under 35 U.S.C. 154(b) by 343 days.

(21) Appl. No.: 15/051,779

(22) Filed: Feb. 24, 2016

(65) Prior Publication Data

US 2016/0271859 A1     Sep. 22, 2016

(30) Foreign Application Priority Data

Mar. 5, 2015  (DE) .................. 10 2015 002 755

(51) Int. Cl.

| | |
|---|---|
| *B29C 49/64* | (2006.01) |
| *B29C 49/42* | (2006.01) |
| *B29L 31/00* | (2006.01) |
| *B29K 67/00* | (2006.01) |
| *B29C 49/06* | (2006.01) |
| *B29C 49/12* | (2006.01) |

(Continued)

(52) U.S. Cl.
CPC ...... *B29C 49/6409* (2013.01); *B29C 49/4252* (2013.01); *B29C 49/06* (2013.01); *B29C 49/12* (2013.01); *B29C 49/36* (2013.01); *B29D 22/003* (2013.01); *B29K 2067/003* (2013.01); *B29L 2031/7158* (2013.01)

(58) Field of Classification Search
None
See application file for complete search history.

(56) References Cited

U.S. PATENT DOCUMENTS

| | | | |
|---|---|---|---|
| 4,147,487 | A | 4/1979 | Dickson et al. |
| 2011/0256493 | A1 | 10/2011 | Schoenberger |
| 2014/0161924 | A1 | 6/2014 | Linke |

FOREIGN PATENT DOCUMENTS

| | | |
|---|---|---|
| DE | 23 52 926 A1 | 4/1975 |
| DE | 24 27 611 A1 | 12/1975 |
| DE | 42 12 583 A1 | 10/1993 |

(Continued)

*Primary Examiner* — Monica A Huson
(74) *Attorney, Agent, or Firm* — Rankin, Hill & Clark LLP

(57) ABSTRACT

A method for temperature conditioning thermoplastic preforms for blow molding. The preforms are guided along a chain path in a transport direction by a plurality of transport and handling means through a heating apparatus. In a heating section, the plurality of heating devices are arranged one after another in the transport direction. On at least one side opposite the heating devices, counter-reflectors are provided, which together with heating devices, form a tunnel-like heating area through which the preforms are transported. In an area of the heating section, a concurrently moving counter-reflector is assigned to each perform or each transport and handling means. The counter-reflectors are guided on a circulating reflector path separate from the chain path, which in the area of the heating section runs parallel to the chain path and in at least one area outside the heating section takes a path route deviating from the chain path.

14 Claims, 8 Drawing Sheets

Figure 1:
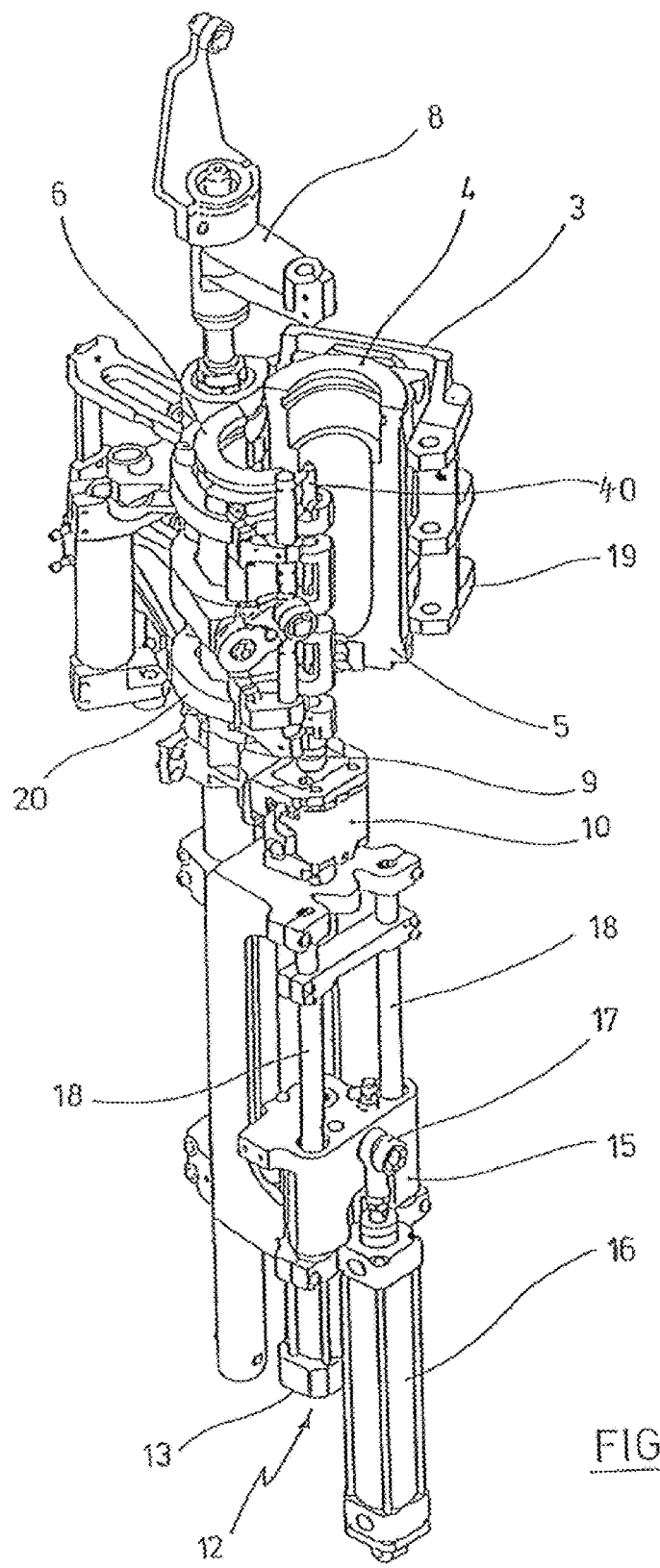

(51) Int. Cl.
  *B29C 49/36* (2006.01)
  *B29D 22/00* (2006.01)

(56) References Cited

FOREIGN PATENT DOCUMENTS

| DE | 43 40 291 A1 | 6/1995 |
|---|---|---|
| DE | 199 06 438 A1 | 8/2000 |
| DE | 10 2010 020 092 A1 | 11/2011 |
| DE | 10 2012 001 229 A1 | 7/2013 |
| DE | 10 2012 025 207 A1 | 7/2014 |

METHOD AND HEATING DEVICE FOR TEMPERATURE CONDITIONING OF PREFORMS AND BLOW MOLDING MACHINE COMPRISING SUCH A DEVICE

The invention relates to a method for temperature conditioning of preforms consisting of a thermoplastic material to a temperature and temperature distribution suitable for blow molding. This temperature conditioning takes place in a heating apparatus which has a plurality of heating devices. The heating apparatus, often designated as an oven, can be, and as a rule is, a component of a blow reshaping machine or blow molding machine, for example. Additionally, this heating apparatus has a plurality of transport and handling means for transporting and handling the preforms through the heating apparatus. Transport takes place along a transport path within the heating apparatus. The transport and handling means are linked in chained fashion and guided on a revolving chain path. Thus this chain path also prescribes the transport path. Such transport and handling means can, for example, be configured as transport mandrels that are known in the prior art in a multiplicity of designs. Along a heating section that is part of the named transport path of the preforms through the heating apparatus, a plurality of heating devices are arranged in stationary fashion, one behind the other, in the direction of transport. These heating devices can, for example, be heating boxes as per prior art. Reflectors are provided on at least one side opposite the heating devices. Additionally, bottom reflectors or head reflectors that protect the mouth section of the preforms can be provided. In the area of the heating devices, the named reflectors, together with these, form a tunnel-like heating area, through which the preforms are transported for purposes of heating. At least in the area of the named heating sections, a concurrently moving reflector is assigned to each preform or each transport and handling means, which is moved with the preform through the heating section.

Additionally the invention relates to a heating apparatus with a plurality of heating devices for temperature conditioning of preforms consisting of a thermoplastic material to a temperature and temperature distribution suitable for blow forming. The heating apparatus has transport and handling means for the transport and handling of preforms through the heating apparatus along a transport path. With this, the transport and handling means are connected to each other in chained fashion and guided on a revolving chain path. This revolving chain path prescribes the transport path of the preforms through the heating apparatus. Along a heating section, which is part of the named transport path of the preforms through the heating apparatus, a plurality of heating devices are arranged in stationary fashion, one behind the other, in the direction of transport. Reflectors are provided on at least one side opposite the heating devices, which, in the area of the heating devices, together with them, form a tunnel-like heating area, through which the preforms are transported for purposes of heating. At least in the area of the named heating sections, a concurrently moving reflector is assigned to each preform or each transport and handling means, which is moved with the preform through the heating section.

Lastly, the invention relates to a blow molding machine, also called a blowing machine, with blowing stations for blow forming of preforms in containers with a heating apparatus as defined above.

With container shaping through action of blowing pressure, preforms made of a thermoplastic material, for example preforms of PET (polyethylene terephthalate), are brought within a blow molding machine, thus within a device for blow-forming production of containers made of preforms, to various processing stations. Typically one such blow molding machine or blowing machine has a heating apparatus and a blowing device, in the area of which preforms, previously tempered in the heating device, are expanded into a container through biaxial orientation. The expansion is aided by pressurized air, which is brought into the preform to be expanded. The procedural sequence with such an expansion of the preform is explained in DE-OS 43 40 291. The introduction of pressurized gas as mentioned at the outset also includes insertion of pressurized gas into the container bubbles developing and insertion of pressurized gas into the preforms at the start of the blow reshaping process or blowing process. Other fluids for blow molding are also known, especially use of the filler material to be injected into the containers as a blowing fluid. The general specification that follows is nevertheless on the example of a blowing machine operating with pressurized gas, without the invention being restricted to such blowing machines.

The basic design of a blowing station for forming containers is described in DE-OS 42 12 583. Options for temperature conditioning of preforms are explained in DE-OS 23 52 926. Explicit reference is made to the texts named, and a further description of the blowing stations and of temperature conditioning is rendered unnecessary in this regard.

Within the device for blow molding, the preforms and the blown containers can be transported with the aid of various transport and handling devices. For example, the use of transport mandrels, onto which the preforms are placed, is known. However, the preforms can also be handled and transported by other carrier devices. The use of gripping tongs for handling and for transport of preforms, and the use of clamping mandrels, which are insertable into a mouth area of the preform, also are among the available designs.

Transport and handling of containers and preforms while using delivery wheels is described, for example, in DE-OS 199 06 438 with an arrangement of a delivery wheel between a blowing wheel and an output section, and of a further delivery wheel between the heating section and the blowing wheel.

The preforms are handled as already explained, on the one hand, in a so-called two-stage procedure, in which the preforms first are made in an injection molding process, and then placed in temporary storage and only later conditioned as regards their temperature and blown into a container. Secondly, an application occurs with the so-called single-stage procedure, in which the preforms, after their injection-molded manufacture and a sufficient solidification, are immediately heat-treated and then blown up.

In regard to the blowing stations used, various embodiment forms are known. With blowing stations that are situated on rotating transport wheels, namely on a so-called blowing wheel, often the form carrier is able to be shut in book fashion. However, it is also possible to employ form carriers that can slide relative to each other or be guided in some other way. With stationary blowing stations which especially are suited to admit a plurality of cavities for container formation, typically plates arranged parallel to each other are used as form carriers.

Before carrying out the heating, the preforms typically are placed on transport mandrels, which either transport the preforms through the entire blowing machine or which only rotate in the area of the heating apparatus. With upright heating of the preforms so that the mouths of the preforms are oriented downwards in a perpendicular direction, the preforms usually are placed on a sheathlike holding element of the transport mandrel. With suspended heating of the preforms, which, with their mouths, are oriented upwards in a perpendicular direction, spreading mandrels as a rule are inserted into the preforms, which securely clamp the preforms. Both active, controllable clamping elements and passive ones are known from prior art. Passive clamping elements effect a clamping for example due to spring force being exerted, against which the preform is placed on the transport mandrel or against which the preforms are removed from transport mandrels, while controls must be manipulated with active transport manuals, for example through actuation or for example via an external curve control which triggers the clamping mechanism and then releases the clamping engagement.

To curtail the required heating time, it is known to use a NIR heater in the area of the heating section, the heating irradiation of which is emitted in a near infrared range, typically with wavelengths between 0.4 and 1 micrometer. The preforms are heated primarily by radiation absorption when the NIR radiation passes through the preform material. For optimization of the energy yield, such heating sections are equipped with a plurality of mirror surfaces, as much as possible to avoid absorption of thermal radiation by structural parts of the heating section, or at least to largely reduce it, and to reflect the NIR radiation again to the preform for heating.

Typically the heating sections are at least in part configured like tunnels, and for this they are for example bordered on the one side by housings for the heating elements, equipped with reflecting properties, as well on the opposite side by a reflector opposite this housing. In the vertical direction, a bottom and/or a cover can provide a bordering, depending on whether the preforms with their mouths are oriented perpendicular upwards or downwards as they are transported through the heating section. These vertical borderings can also be configured as reflectors. In addition, it is customary to protect the mouth area of the preform from heating radiation by means of reflectors that are carried along, for example, since this area is already distinctively manufactured and should not undergo further deformation in the blow forming.

True, in the prior art, not merely are stationary reflectors known that are placed opposite the heating elements, which are designated hereinafter as counter-reflectors, for example for making a distinction from bottom or head reflectors, but also counter-reflectors that move with the preform. Thus, for example, U.S. Pat. No. 4,147,487 discloses a heating apparatus with transport and handling means in the form of a transport mandrel. Semicylindrical, arched counter-reflectors are arranged on the side of the preform facing away from the heating element. These counter-reflectors are moved by the same transport mechanism as the mandrels on which the preforms are placed.

Also, DE 10 2012 025 207 A1 discloses counter-reflectors that move concurrently with the preforms. There the counter-reflectors are arranged on the handling device and move along the transport path of the preform with the handling device.

With this prior art, it is viewed as a disadvantage that in these prior-art designs, it is not possible, or only at great expense, to replace the counter-reflectors, for example, for adaptation to another geometry of preforms when changing the containers to be manufactured. However, it would be desirable that the counter-reflectors be configured so as to be shape-adapted to the preforms. For that, it is required, when changing the type of preform, to also be able to change out the counter-reflectors. Also to be viewed as a disadvantage is that, to each transport element or handling element, a counter-reflector is assigned, although always only a part of these transport means is actually situated in the area of the heating section. Lastly, it is viewed as a disadvantage, that the prior-art counter-reflectors that move concurrently are a hindrance in the area where preforms enter the heating apparatus, thus especially when inserting a transport mandrel into the preform. This is also true in analogous fashion when removing the preform from the heating apparatus. Here, as per prior art, the counter-reflector is to be so arranged and configured, that the preform and transport mandrel are able to be interlocked and separated. The distance between the preform and counter-reflector is to be dimensioned with appropriate size.

The object of the present invention consists in eliminating the above-named disadvantages and providing methods and devices by which the above-named disadvantages with the counter-reflectors moving with the preforms are overcome.

This object is achieved with a method according to the features of claim 1, by a heating apparatus with the features of claim 7 and with a blow molding machine with the features of claim 12.

Additional advantageous embodiments are the subject of the subordinate claims or are derived from advantageous developments which are indicated in the description of the figures.

According to the invention, provision is made that the counter-reflectors are guided on a reflector path that is independent of, and separated from, the chain path, on which the transport and handling means, connected in chained fashion, rotate. In the area of the heating section, the reflector path runs parallel to, and at a first distance from, the chain path. In this area, the reflector is to carry out its function, and therefore is to run together with the preform at a suitable distance. This is attained by a parallel guidance of chain path and reflector path. Preferably the distance in this area between the two paths will essentially remain the same. In at least one area outside the heating section, advantageously the reflector path will take a route that deviates from the chain path, which means that the common parallel route between the chain path and reflector path is canceled there. Preferably in this area, the reflector path is at a greater distance from the chain path than in the area of the heating section, in order for example to facilitate access to the reflectors, or to implement a shorter section length of the reflector path than that of the chain path.

The counter-reflectors are only needed in the area of the heating section, and in this regard, according to the invention provision is made that for joint passage through the heating section, motion is coupled between a counter-reflector and a preform to be heated. This coupling of motion occurs, for example, by coupling the counter-reflector to the transport and handling means carrying the preform. For that, suitable coupling means are provided, for example, on the coupling-pair elements to be coupled. Additionally, provision is made according to the invention that said motion coupling is discontinued at the latest in an area outside the heating section. In this way, the preform and the counter-reflector assigned in the heating section can be guided in motion-uncoupled fashion at least on part of the path outside the heating section. The latter makes it possible to let the reflector path take a route different from the chain path. Especially, the reflector path can be configured to be considerably shorter, so that, for example, the number of counter-reflectors required can be reduced. In particular, it is possible to guide the reflector path into certain areas of the transport path of the preform at a greater distance from the chain path than, for example, in the area of the heating section, where the preform and counter-reflector should be guided close to each other and in synchronous fashion so that in such areas outside the heating section, the counter-reflectors can be at a greater distance, so as to make possible a free access to the preforms, for example for placement of the preforms onto transport mandrels or removal of the tempered preforms from transport mandrels. At the same time, in these areas outside the heating section, there is a possibility of making possible freer access to the counter-reflectors, for example to replace these with other shape-adapted counter-reflectors, if a switch is made, for example, to another type of preform. The distance between the chain path and reflector path can, for example, be chosen to be large enough outside the heating section that operating personnel can obtain free access to the reflectors, to replace them. Suitable access areas would especially be the areas in which the guide wheels of the chain path are arranged.

It is in principle possible to equip the counter-reflectors on the reflector path with their own drive. Conceivable, for example, are motor drives or also to line the counter-reflectors up one on another in chained fashion, and to drive the chain analogous to the chain path which the transport and handling means move in circular fashion. An alternative that is simpler in design terms is that the counter-reflectors are placed one on another and closely adjoining on the reflector path. A forward-moving counter-reflector then pushes the adjoining counter-reflector, so that overall the counter-reflectors circulate on the reflector path, without many drive means being provided for this. True, synchronization is then required between the motion of the counter-reflectors and the motion of the preforms. It is more advantageous and simpler for design to couple the counter-reflectors in the area of the heating section with the transport and handling means driven and rotating on the chain path. The drive, present in any case, for the transport and handling means then leads to a forward motion of the counter-reflectors. Due to the coupling, the motion is likewise automatically synchronized. In particular, the need to provide a separate drive for the counter-reflectors is eliminated. This is also advantageous in regard to retrofitting existing blowing machines and existing heating apparatus, and facilitates replacement of counter-reflectors, since no coupling connections, for example, to the drive means need to be removed.

The reflector path is advantageously configured as a guide rail, into which the counter-reflectors can be suspended and removed. For this, the counter-reflectors have rollers for rolling on the guide rails. This ensures low-friction motion of the counter-reflectors on the guide rail, and the counter-reflectors can be suspended and removed in simple fashion, for example, to be changed out for counter-reflectors adapted to other preform types.

Embodiment examples of the invention are depicted schematically in the drawings. Shown are:

FIG. 1: A perspective drawing of a blowing station for manufacture of containers from preforms, FIG. 2: a longitudinal section through a blow form, in which a preform is stretched and expanded, FIG. 3: a sketch to illustrate a basic design of a device for blow forming of containers, FIG. 4: a modified heating section with expanded heating capacity, FIG. 5: a side view of a prior-art holding device, FIG. 6: a vertical section along section line VI in FIG. 5, FIG. 7: a view of the reversing-direction area of an invention-specific heating apparatus with counter-reflectors guided on a reflector path, FIG. 8: a longitudinal section through a heating device, a transport mandrel and a counter-reflector in the area of the motion-coupled heating section passed through.

Figure 2:
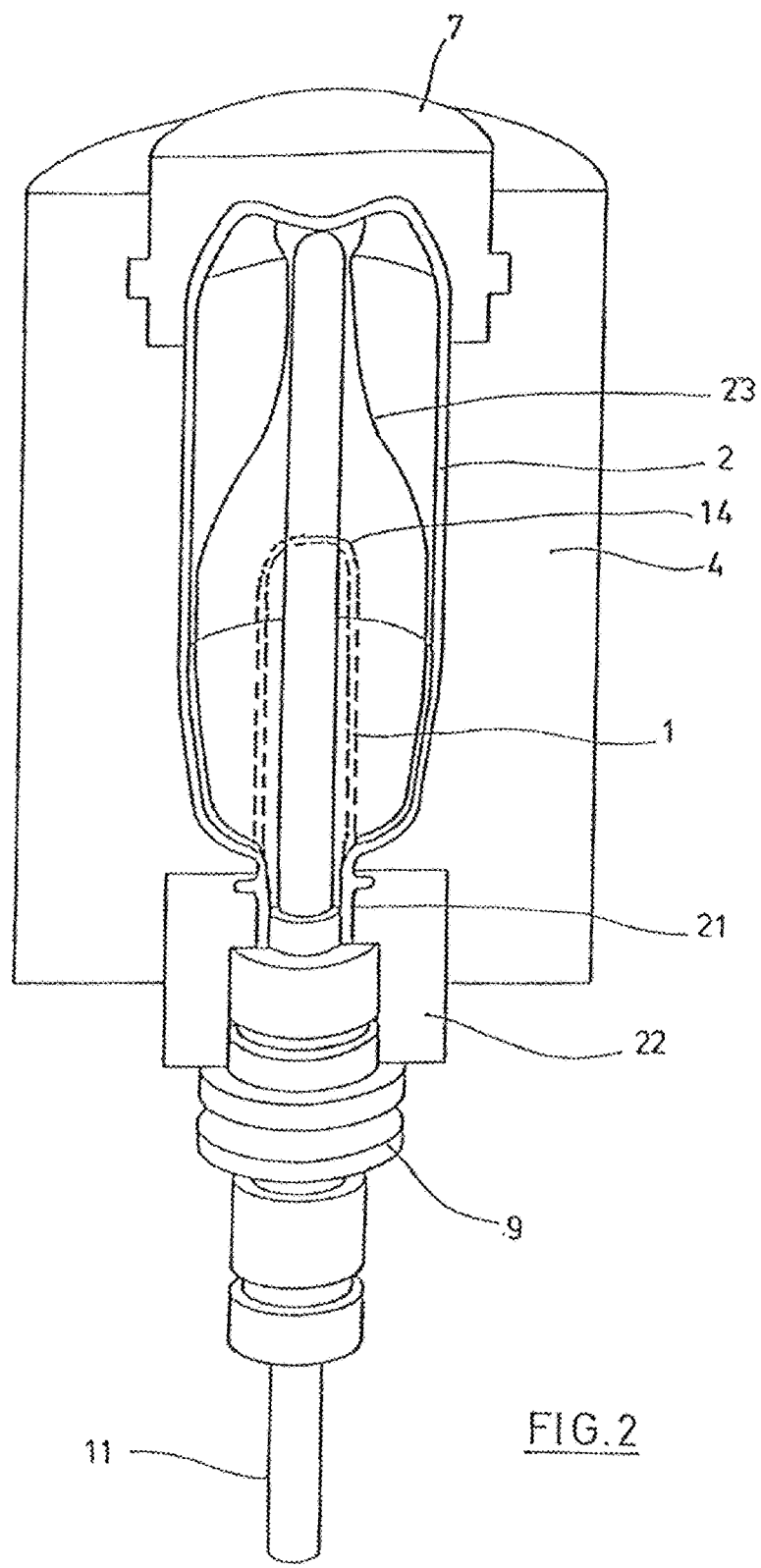

The general design of a device for reshaping of preforms (1) in containers (2) is depicted in FIG. 1 and FIG. 2. The arrangement can be as depicted, or turned by 180° in a vertical plane.

The device for forming the container (2) in essence comprises a blow station (3) which is equipped with a blow form (4), into which a preform (1) can be inserted. The preform (1) can be an injection-molded piece made of polyethylene terephthalate. To make it possible to insert the preform (1) into the blow form (4), and make it possible to remove the finished container (2), the blow form (4) comprises form halves (5, 6) and a bottom piece (7), which can be positioned by a lifting device (8). The preform (1) can be fixed by a holding element (9) in the area of the blow station (3). This holding element (9) can, for example, be designed according to the invention, or as known in prior art. For example, it is possible to place the preform (1) directly into the blow form (4) using tongs or other handling means. To make it possible to feed compressed air, beneath the blow form (4) an attachment ram (10) is placed, which feeds compressed air to the preform (1) and simultaneously effects a sealing. However, it is also conceivable in principle with a variant design to employ fixed compressed air lines.

The preform (1) is stretched in this embodiment example with the aid of a stretching rod (11), which is positioned by a cylinder (12). According to another embodiment form, the stretching rod (11) is mechanically positioned via cam segments which are acted upon by tapping rollers. The use of cam segments is especially appropriate where a plurality of blow stations (3) are placed on a rotating blow wheel (25).

In the embodiment form of FIG. 1, the stretching system is configured so that two cylinders (12) are placed in a tandem arrangement. Initially, before the start of the actual stretching process, the stretching rod (11) is moved by a primary cylinder (13) into the area of a base (14) of the preform (1). During the actual stretching process, the primary cylinder (13) with the deployed stretching rod is positioned jointly with a slide (15) bearing the primary cylinder (13) by a secondary cylinder (16) or by cam control device. What is especially intended with this, is to employ the secondary cylinder (16) in cam-controlled fashion so that by a guide roller (17) which glides along a curved path while the stretching process is carried out, a current stretching position is preset. The guide roller (17) is pressed by the secondary cylinder (16) against the guide path. The slide (15) glides along two guiding elements (18).

After closure of the two form halves (5, 6) placed in the area of carriers (19, 20), the carriers (19, 20) lock relative to each other with the aid of a locking device (40). For adaptation to different shapes of a mouth section (21) of the preform (1), according to FIG. 2, provision is made for use of separate threading inserts (22) in the area of the blow form (4).

In addition to the complete blown container (2), FIG. 2 also uses dotted lines to show the preform (1) and, schematically, a container bubble (23).

Figure 3:
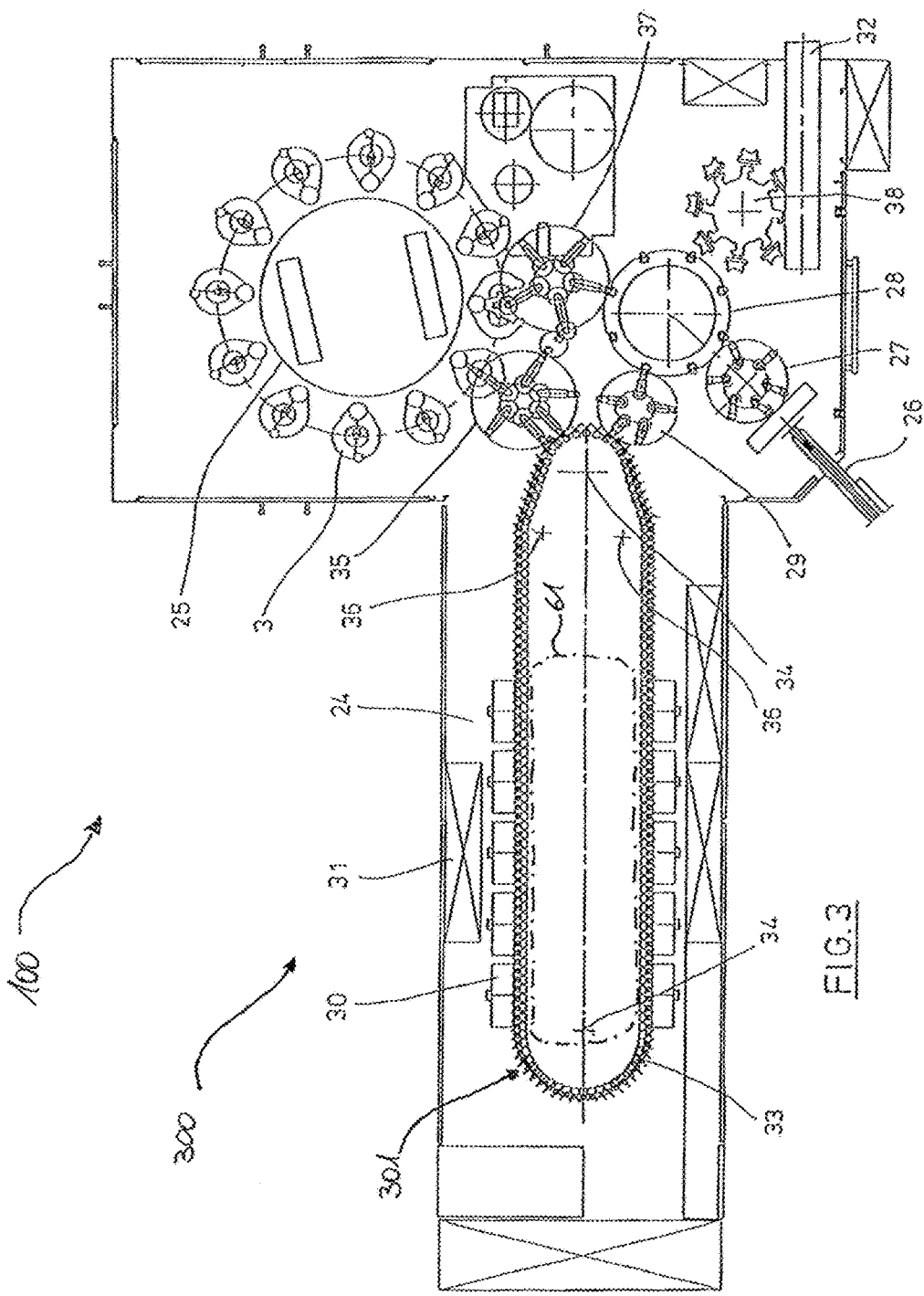

FIG. 3 shows the basic design of a blowing machine, which is equipped with a heating section (24) and a rotating blow wheel (25). Proceeding from a preform insertion (26), the preforms (1) are transported by delivery wheels (27, 28, 29) into the area of the heating section (24). Along the heating section (24), radiant heaters (30) are placed as heating devices as well as fans (31), to temper the preforms (1). Currently the heating section (24) consists of two sectional parts, which are separated from each other by a reversing-direction area at guiding wheel (34). After the preforms (1) have been sufficiently tempered, they are delivered by a delivery wheel (35) to the blow wheel (25), in the area of which the blow stations (3) are situated. The completed, blown containers (2) are passed by additional delivery wheels (37, 28, 38) to an output section (32). The delivery wheel (37) is configured as a removal wheel and the delivery wheel (38) as an output wheel.

To be able to reshape a preform (1) in a container (2), so that the container (2) has material properties that ensure that foodstuffs, especially beverages, that are inserted are capable of being placed for lengthy periods within the container (2), special procedural steps must be complied with in heating and orienting the preforms (1). In addition, advantageous effects can be obtained by complying with special dimensioning regulations. Various plastics can be used as the thermoplastic material PET, PEN or PP, for example, can be used.

The preform (1) is expanded during the orientation process by supplying compressed air. The supplying of compressed air is divided into a pre-blowing phase, in which gas, for example compressed air, is fed at a low pressure level, and a following main blowing phase, in which gas is fed in at a higher pressure level. During the pre-blowing phase, typically compressed air is used with a pressure at an interval from 10 bar to 25 bar, and during the main blowing phase, compressed air is fed with a pressure at an interval from 25 bar to 40 bar.

Also perceptible from FIG. 3 is that with the depicted embodiment firm, the heating section (24) is part of the transport path of the preforms (1). The preforms (1) are transported in the heating apparatus (300) using a plurality of circulating transport elements (33) which are lined up one on another in chained fashion and guided along by guide wheels (34, 36). The circulating transport elements (33) thus move along a chain path (301), which also forms the transport path of the preforms, since the preforms (1) are guided along the chain path (301). What especially is in view with this is to lay out an essentially rectangular contour through the chainlike arrangement of the transport elements (33). With the embodiment form depicted, in the area of the extension of the heating section (24) facing the delivery wheel (27), a single guide wheel (34), with relatively large dimensions, and in the area of the adjoining turnaround points, two comparatively smaller-dimensioned guide wheels (36) are used. However, any other guides are also conceivable.

To make possible a relative arrangement of the delivery wheel (27) and of the blow wheel (25) as close to each other as possible, the depicted arrangement proves to be especially appropriate, since in the area of the corresponding extension of the transport path (301), three guide wheels (34, 36) are positioned, and each of the smaller guide wheels (36) in the area of the transition to the linear stretches of the transport path (301) and the larger guide wheel (34) in the immediate delivery area to the delivery wheel (27) and to the blow wheel (25). As an alternative to use of chainlike transport elements (33) it is also for example possible to employ a rotating heating wheel.

After blowing of the containers (2) is complete, they are brought out of the area of the blow stations (3) by the delivery wheel (38) and transported to the output section (32).

Figure 4:
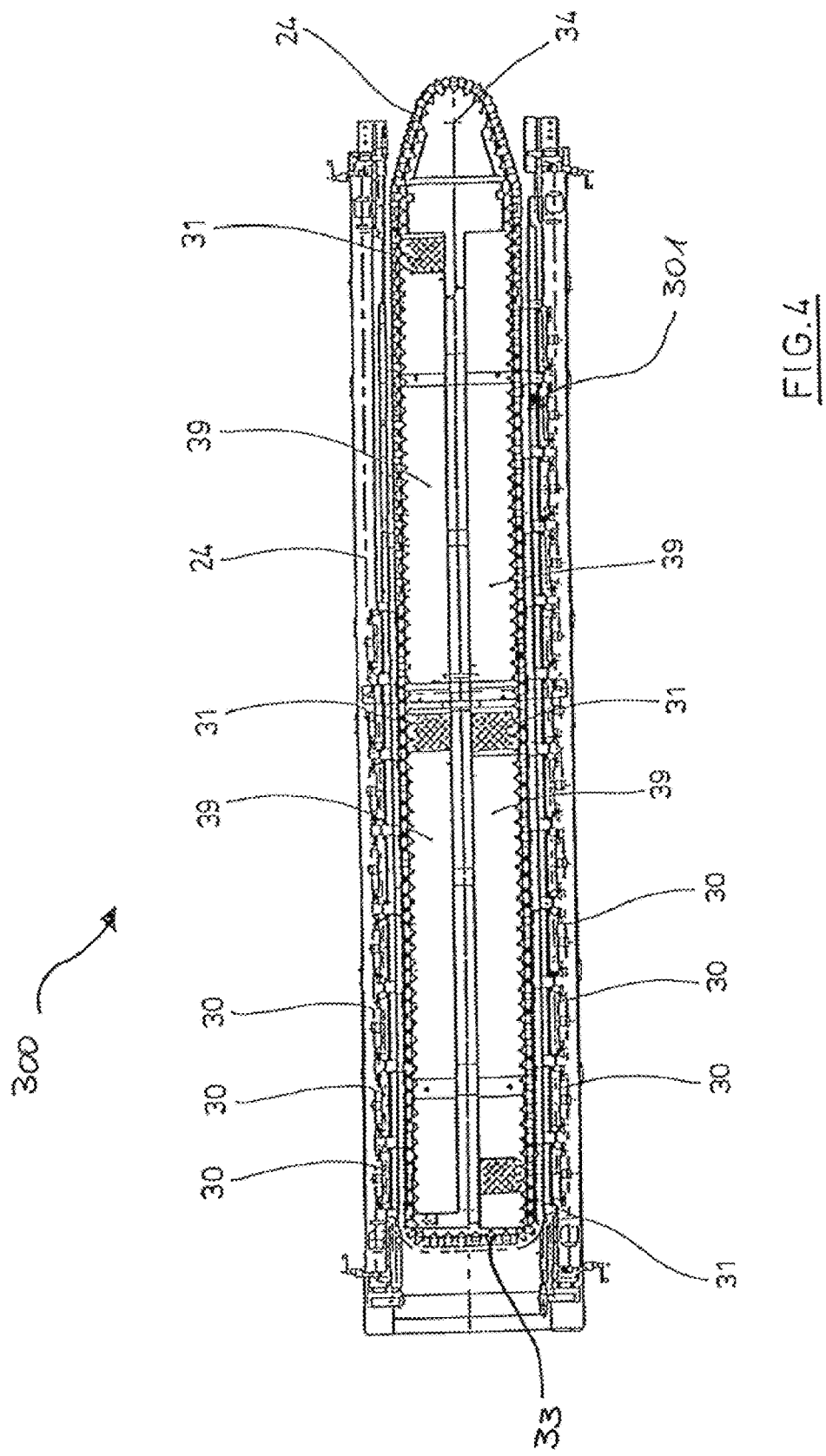

In the modified heating apparatus (300) depicted in FIG. 4, a large number of preforms (1) can be tempered per unit of time by the larger number of radiant heaters (30). Here the fans (31) direct cooling air into the area of cooling air channels (39), each of which lies opposite the assigned radiant heaters (30) and release the cooling air via outflow openings. Through the arrangement of outflow openings, a flow direction is implemented for the cooling air that is essentially transverse to a transport direction of the preforms (1). In the area of the surfaces lying opposite the radiant heaters (30), the cooling air channels (39) can provide counter-reflectors for the radiant heating, likewise it is possible via the emitted cooling air to implement cooling of the radiant heaters (30).

The preforms (1) and the containers (2) can be transported through the blowing machine (100) in various ways and means. According to one embodiment variant, the preforms are carried by transport mandrels at least along the major part of their transport path. However, it is also possible to transport the preforms using tongs which grip the outside of the preform, or use inner mandrels, which are inserted into a mouth section of the preform. Likewise, different variants are conceivable as regards the spatial orientation of the preforms.

According to one variant, in the area of the preform input (26), the preform is fed with its mouth oriented upward in a vertical direction, then turned, directed along the heating section (24) and the blow wheel (25) with its mouth oriented downward in a vertical direction, and then again turned before reaching the output section (32). According to another variant, the preform (2) is heated in the area of the heating section (24) with its mouth oriented downward in a vertical direction, but then turned again by 180° before reaching the blow wheel (25). According to a third embodiment variant, the preform runs through the entire area of the blowing machine (100) without undergoing turning motions, with its mouth oriented upward in a vertical direction.

Figure 5:
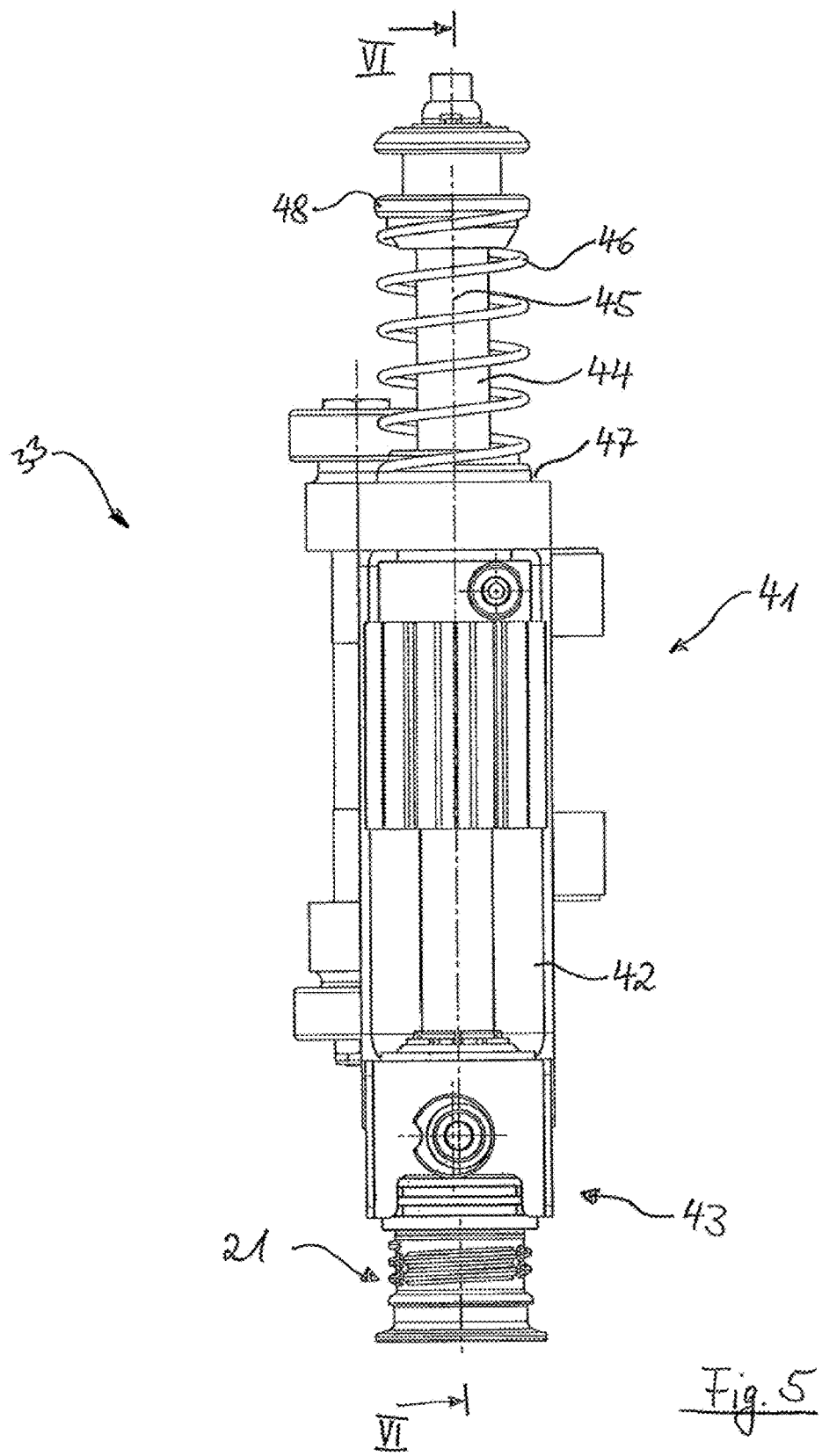

FIG. 5 shows a partial depiction of a side view of a preform (1), into the mouth section (21) of which, in segments, a holding device (41) known from prior art is inserted. This holding device (41) is an example of a transport element (33) which is schematically shown in FIGS. 3 and 4.

The holding device (41) shown as an example has an element base (42), a head (43) facing toward the preform (1) and a shaft (44) connected with the head (43). The shaft (44) with the head (43) is movable relative to the element base (42) in the direction of a longitudinal axis (45) of the element. A base position of the shaft (44) relative to the element base (42) can be preset by a spring (46). The spring (46) in the depicted embodiment example is situated between a top side (47) of the element base (42) and an end segment (48) projecting laterally over the shaft (44).

According to a typical embodiment example, a plurality of element bases (42) can be connected with each other in chained fashion or connected with a circulating transport chain. There arises thereby an arrangement as is shown in FIGS. 3 and 4. The holding device (41) can, however, also be attached onto rotating delivery wheels or other arrangements. Likewise, according to a typical embodiment example, the shaft (44) can be positioned relative to the element base (42) in cam-controlled fashion via a cam curve that extends at least in sections along a transport path of the carrier element (41).

Figure 6:
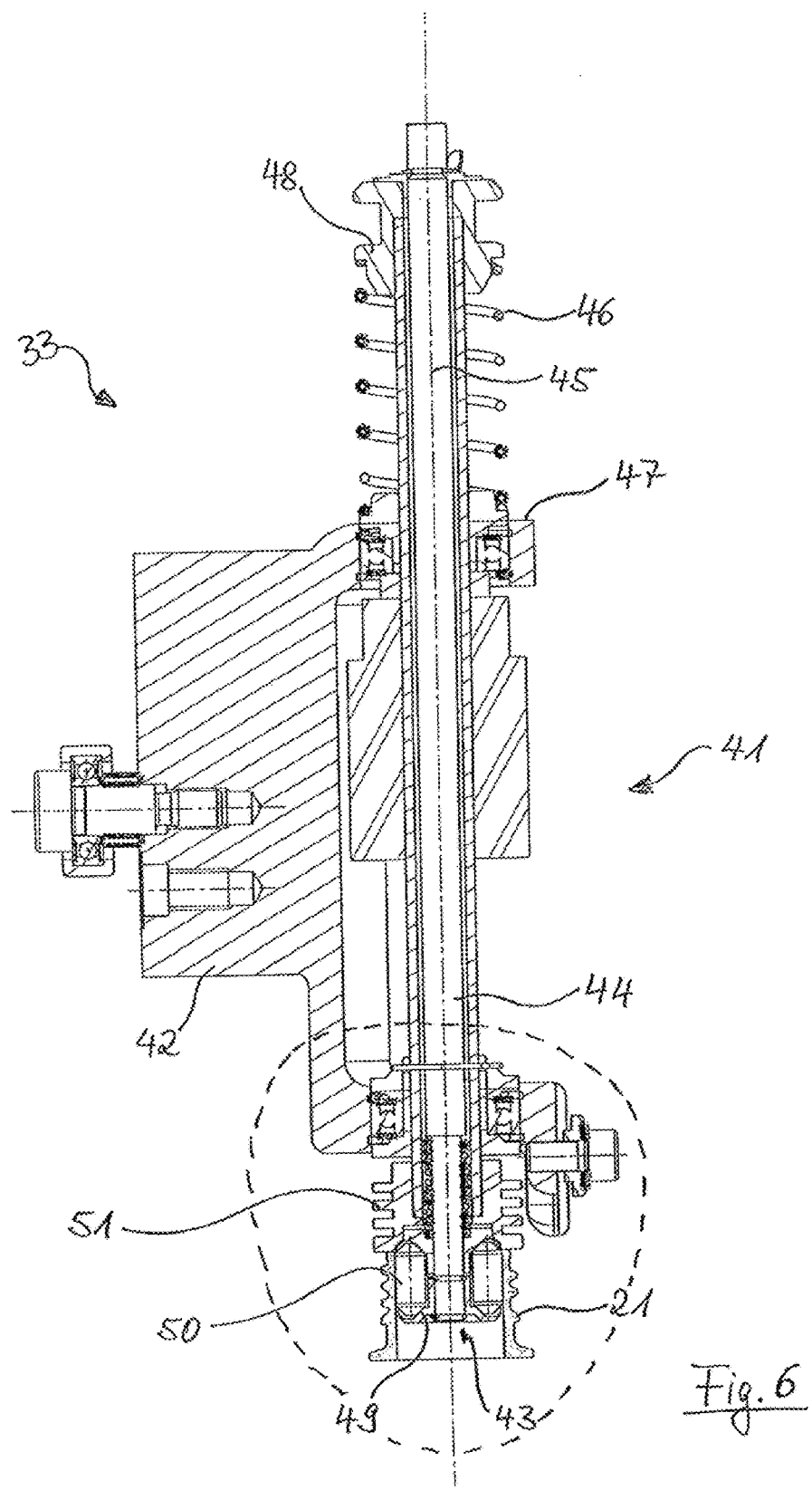

FIG. 6 shows, in a longitudinal section, the positioning of the head (43) within a mouth section (21) of a preform (1) or of a container (2). It is perceived that the head (43) has recesses (49), in which clamping elements (50) are situated. Outside of the area insertable into the mouth section (21), the head (43) can have a cooling body (51), which is equipped with cooling ribs for heat dissipation.

Figure 7:
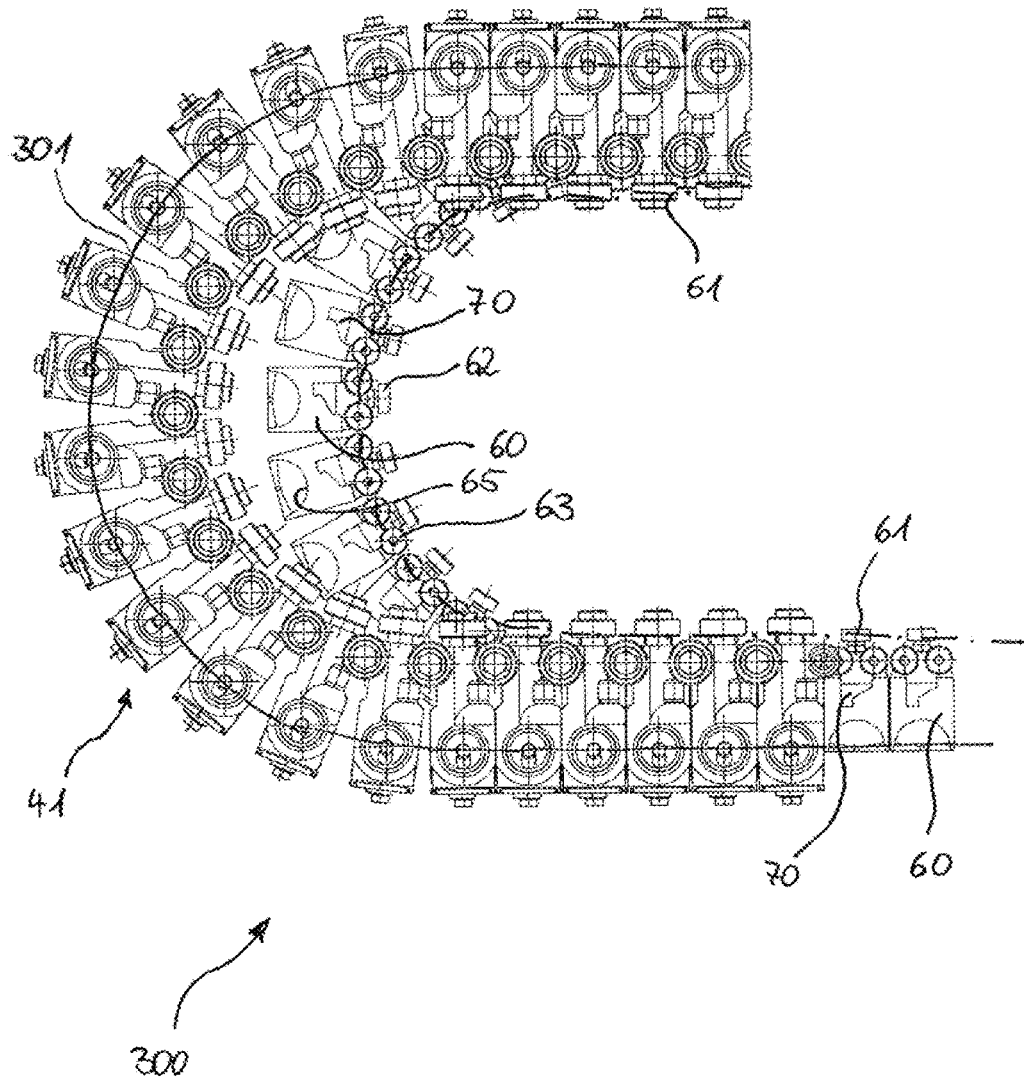

FIG. 7 shows in one view the holding devices (41) or transport elements (33), joined in chained fashion, circulating in the area of the turnaround point, thus for example in the area of the guide wheel (34) of FIG. 3. The radiant heaters (30) shown in FIG. 3 are here omitted for reasons of clarity. True, as compared to FIG. 3 the counter-reflectors (60) are additionally shown, circulating on a reflector path (61). The reflector path (61) itself can, for example, be designed as a customary guide rail or running rail and is not shown for reasons of clarity, so as not to block the view from above of the counter-reflectors (60). It is shown only as a dots-and-dashes line, to make clear in particular the route relative to the chain path (301). The same dots and-dashes line is also seen in FIG. 3. It makes clear that in the area of the heating section (24) the reflector path (61) runs parallel and equidistant to the chain path (301) and that there the interval is small, so that the counter-reflector (60) is guided close to the preform (1). In the areas outside the heating section (24), especially at the turnaround points of the chain path (301), the reflector path (61) takes a totally different route, more distant from the chain path.

In the view of FIG. 7, in the turnaround area of the chain path (301), the coupling elements (70) of the counter-reflectors (60) are visible, which are configured in the embodiment example shown as follower bodies, which, upon reaching an appropriate interval of the chain and reflector path, use contact surfaces to make contact with the transport means (33) and are taken along with the moved transport means (33). This convergence of the reflector and chain path is well justified when tracking the relative positions of the transport means (33) and the counter-reflectors (60) in the direction of the clockwise motion of preforms (1).

Figure 8:
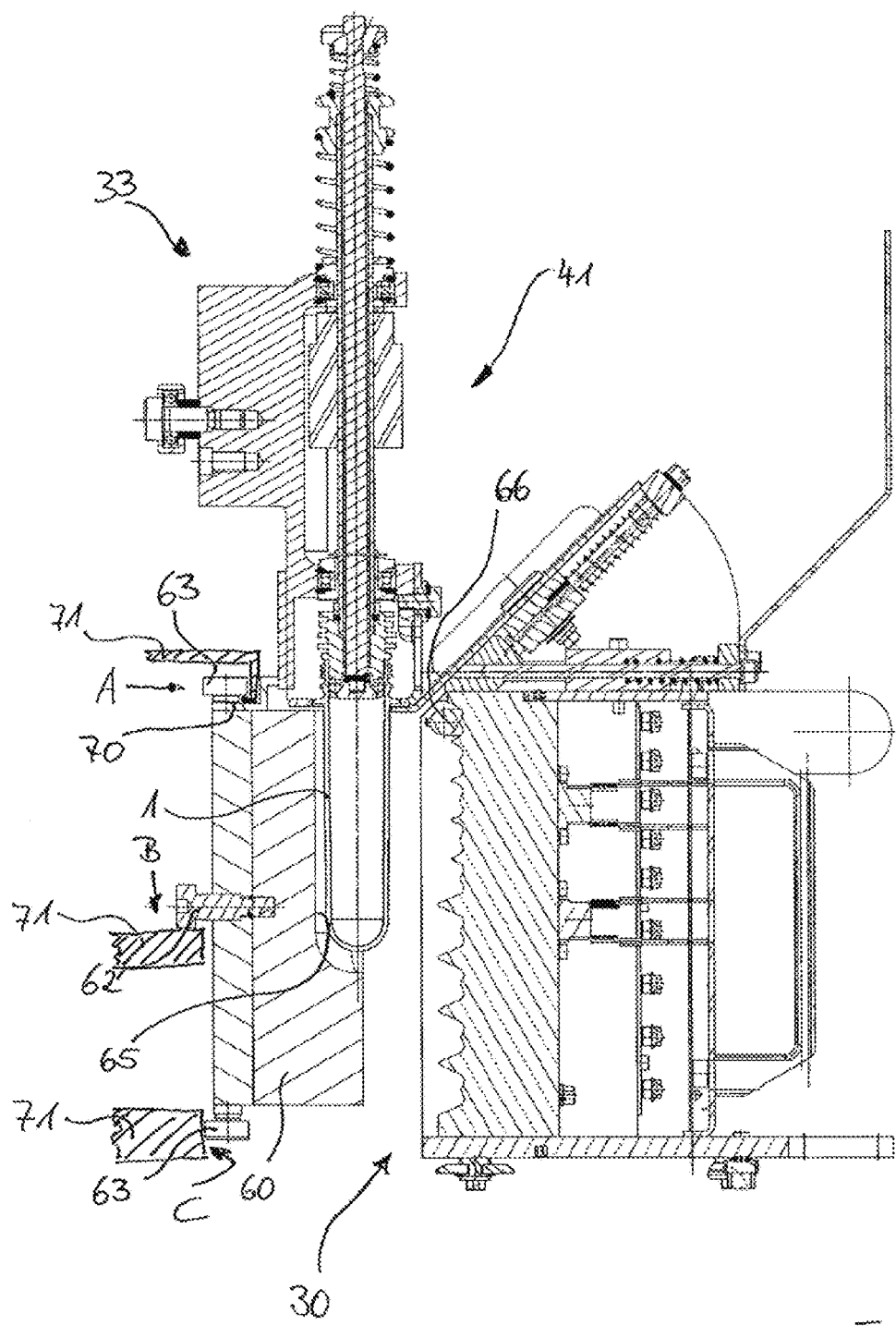

FIG. 8 shows a section in the area of the radiant heater (30) through such a following counter-reflector (60). In this area of the radiant heater (30) the counter-reflector (60) is motion-coupled to the transport element (33) or connected to the holding device (41), which can be configured in the manner explained, for example, in FIGS. 5 and 6. Only one heater (66) is shown for the heating device (30), whereas a plurality of heating elements is situated one over the other in a vertical direction as a rule. These additional heating elements would thus be arranged in distributed fashion beneath the depicted heater (66) above the height extension of the preform (1).

It is perceptible in FIG. 8 that the concurrently moving counter-reflector (60) turned toward the preform has a shape-adapted inner contour (65), to surround the preform (1) as equidistant as possible over its partial circumference area facing toward the reflector at a small distance. In this way, the thermal radiation emitted by the heater (66) can be effectively reflected and be thrown back onto the preform (1). Since the concurrently moving counter-reflector (60), as is evident for example from FIG. 7, in the turnaround area of the chain path (301) is moved away from the transport element (33), free access is nonetheless possible for the preform (1) to and from the transport element (33), as typically is required for placement and removal processes, for example in cooperation with gripping tongs or delivery wheels known from prior art. Especially the transport element (33) can be moved up, without colliding with the counter-reflector (60).

Additionally, FIG. 8 shows that the coupling element (70) extends in the direction of the preform to the lower end of the transport element (33) and, by coming into contact with the side of the transport element (33) facing away from view, is taken along with movement of same. When the interval between the counter-reflector (60) and the transport element (33) is increased, for example with a corresponding route of the running rail (71) relative to the chain path (301), the coupling element disengages from the transport element (33). This occurs, for example, outside, or at the end, of the heating section (24).

Referring to FIG. 3, dots and dashes are used to show a possible route for the reflector path (61). It is perceptible that especially in the entry and exit area of the circulating chain, the reflector path (61) diverges significantly from the route of the chain path (301). The number of chain members of the circulating chain is thereby considerably larger than the number of circulating counter-reflectors (60). In this area, it is also possible for a single operating person to, for example, replace the counter-reflectors (60).

The counter-reflectors (60) are equipped with running rollers (63) or guide rollers (62). These running or guide rollers (62, 63) are chosen in connection with the contouring of the running rails, so that it is possible to slide the counter-reflectors (60) with low friction, and at the same time easily remove and suspend the counter-reflectors (60). Appropriate running rail systems and appropriate running rollers are known in the prior art for many applications, so that a detailed description can be dispensed with here.

In FIG. 8, only the support areas of a running rail (71) are shown with three support points A, B and C, on which the counter-reflector (60) is supported in the vertical direction (support point B) and in the horizontal direction (support points A and C). By means of a tipping and pulling motion around support point B, the counter-reflector (60) can be suspended onto the running rail (71) and removed from it.

The invention claimed is:

1. A method for temperature conditioning of preforms made of a thermoplastic material to a temperature and temperature distribution suitable for blow forming in a heating apparatus with a plurality of heating devices, wherein:
   the heating apparatus has a plurality of transport and handling means for transporting and handling the preforms through the heating apparatus along a transport path;
   the transport and handling means are connected in chained fashion and guided along a circulating chain path;
   along a heating section, which is a part of the transport path, the plurality of heating devices are arranged in a stationary, one behind another in a transport direction;
   on at least one side lying opposite the heating devices, counter-reflectors are provided, which, in an area of the heating devices, and together with the heating devices, form a tunnel-like heating area, through which the preforms are transported for purposes of heating;
   at least in an area of the heating section, a concurrently moving counter-reflector is assigned to each preform or to each transport and handling means, which is moved concurrently with the preform through the heating section; and
   the counter-reflectors are guided on a circulating reflector path separated from the circulating chain path, which in the area of the heating section runs parallel to and at a first distance spaced apart from the circulating chain path and which, in at least one area outside the heating section takes a route deviating farther from the circulating chain path, such that the deviating route runs at a second distance that is greater than the first distance from the circulating chain path.

2. The method of claim 1, wherein for common passage of the heating section the counter-reflector and the preform are detachably motion-coupled, wherein the motion coupling is discontinued at in an area outside the heating section, so that at least on part of a route outside the heating section, the preform and the counter-reflector are guided in a motion-uncoupled fashion.

3. The method of claim 2, wherein the coupling occurs on the transport and handling means that carry the preform.

4. The method of claim 1, wherein the reflector path is shorter than the circulating chain path, and an amount of circulating counter-reflectors is smaller than an amount of circulating transport and handling means.

5. The method of claim 1, wherein counter-reflectors situated adjacent to one another are not coupled to each other, and wherein the counter-reflectors are arranged and guided in such a close arrangement on the reflector path that counter-reflectors border on each other with little space there between.

6. The method of claim 1, wherein the reflector path, is configured as a guide rail, onto which the counter-reflectors are suspended and removed.

7. A heating apparatus comprising a plurality of heating devices for temperature conditioning of preforms made of a thermoplastic material to a temperature and temperature distribution suitable for blow molding, wherein:
the heating apparatus has a plurality of transport and handling means for transporting and handling the preforms through the heating apparatus along a transport path;
the transport and handling means are connected in a chained fashion and guided on a circulating chain path;
along a heating section, which is part of the transport path, the plurality of heating devices are arranged in a stationary manner, one lying behind another in a transport direction;
on at least one side opposite the heating devices, counter-reflectors are provided, which form together with the heating devices a tunnel-like heating area in an area of the heating devices, through which the preforms are transported for purposes of heating;
at least in an area of the heating section a concurrently-running counter-reflector is assigned to each preform or each transport and handling means, which is configured to run concurrently with the preform through the heating section;
the counter-reflectors are guided on a circulating reflector path that is separate from the circulating chain path;
in the area of the heating section the reflector path runs parallel and at a first distance spaced apart from the circulating chain path;
in at least one area outside the heating section, the reflector path takes a route that deviates from the circulating chain path; and
in this area with a deviating route, the reflector path runs at a second distance away from the circulating chain path that is greater than the first distance.

8. The apparatus of claim 7, wherein the counter-reflectors have coupling elements which are engageable into, and disengageable from, corresponding coupling elements of the transport and handling means, so that the counter-reflector and the preform are detachably motion-coupled for common passage of the heating section, and wherein the coupling is discontinued in an area outside the heating section, so that the preform and counter-reflector are guided in motion-uncoupled fashion at least on part of a route outside the heating section.

9. The apparatus of claim 7, wherein the reflector path is configured as a running rail and the counter-reflectors with rollers are guided on the running rail.

10. The apparatus of claim 7, wherein the reflector path has a shorter length than the circulating chain path and runs inside the circulating chain path.

11. The apparatus of claim 7, wherein the counter-reflectors have interior contours shape-adapted to the preforms.

12. A blow shaping machine comprising blowing stations for blow forming of preforms into containers, and a heating apparatus of claim 7.

13. The method of claim 6, wherein the counter-reflectors have rollers for rolling on the guide rails.

14. The apparatus of claim 8, wherein the counter-reflector and the preform are detachably motion-coupled by the coupling onto the transport and handling means carrying the preform.

* * * * *